(12) United States Patent
Passal et al.

(10) Patent No.: US 8,982,594 B2
(45) Date of Patent: Mar. 17, 2015

(54) CIRCUIT FOR CONTROLLING A SWITCH IN SERIES WITH A CAPACITIVE ELEMENT

(75) Inventors: Antoine Passal, Monnaie (FR); Laurent Gonthier, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 125 days.

(21) Appl. No.: 13/332,830

(22) Filed: Dec. 21, 2011

(65) Prior Publication Data

US 2012/0163053 A1    Jun. 28, 2012

(30) Foreign Application Priority Data

Dec. 23, 2010   (FR) ...................................... 10 61118
Aug. 8, 2011    (FR) ...................................... 11 57231

(51) Int. Cl.
H02M 7/06     (2006.01)
H02M 7/155    (2006.01)
H02M 1/00     (2006.01)

(52) U.S. Cl.
CPC ............ *H02M 7/1557* (2013.01); *H02M 7/155* (2013.01); *H02M 2001/0032* (2013.01); *Y02B 70/16* (2013.01)
USPC ....................................................... 363/126

(58) Field of Classification Search
USPC ........ 363/44, 45, 84, 126; 323/239, 300, 324, 323/325
See application file for complete search history.

(56) References Cited

U.S. PATENT DOCUMENTS

| 3,421,063 | A |   | 1/1969  | Reinke |
|---|---|---|---|---|
| 3,979,644 | A | * | 9/1976  | Everhart ...................... 361/91.6 |
| 4,353,025 | A | * | 10/1982 | Dobkin .......................... 323/300 |
| 4,459,435 | A | * | 7/1984  | Foldvary et al. ............... 379/199 |
| 5,600,552 | A | * | 2/1997  | McCavit et al. ................. 363/89 |
| 5,889,374 | A | * | 3/1999  | Pezzani .................... 318/400.26 |
| 6,195,271 | B1 |  | 2/2001  | Suzuki et al. |
| 6,208,126 | B1 |  | 3/2001  | Gonthier et al. |
| 6,294,901 | B1 |  | 9/2001  | Peron |
| 6,300,748 | B1 | * | 10/2001 | Miller .......................... 323/266 |
| 6,373,319 | B1 | * | 4/2002  | Rault ............................ 327/452 |
| 7,084,692 | B2 |  | 8/2006  | Peron et al. |
| 7,151,402 | B2 |  | 12/2006 | Peron et al. |
| 7,224,087 | B2 |  | 5/2007  | Gonthier et al. |

(Continued)

FOREIGN PATENT DOCUMENTS

DE    1178115 B     9/1964
DE    1982736 A1    9/1999

(Continued)

OTHER PUBLICATIONS

French Search Report and Written Opinion dated Jan. 16, 2012 from corresponding French Application No. FR 11/57231.

(Continued)

*Primary Examiner* — Adolf Berhane
(74) *Attorney, Agent, or Firm* — Allen, Dyer, Doppelt, Milbrath & Gilchrist, P.A.

(57) ABSTRACT

A circuit for controlling a switch in series with a capacitive element. A circuit may include a bidirectional switch and a diode in parallel with first and second conduction terminals of the switch. The switch may be configured to control a capacitive element adapted to be coupled to an A.C. voltage. The switch includes first and second conduction terminals configured to conduct a same current when the switch is activated.

32 Claims, 1 Drawing Sheet

(56) References Cited

U.S. PATENT DOCUMENTS

| | | |
|---|---|---|
| 7,236,383 B2 | 6/2007 | Peron et al. |
| 7,403,200 B2 * | 7/2008 | Abdoulin .................. 345/211 |
| 7,483,280 B2 * | 1/2009 | Benabdelaziz et al. ......... 363/44 |
| 7,605,570 B2 * | 10/2009 | Liu et al. ................. 323/207 |
| 7,847,440 B2 * | 12/2010 | Mosebrook et al. .......... 307/139 |
| 8,129,976 B2 * | 3/2012 | Blakeley ................. 323/312 |
| 8,212,425 B2 * | 7/2012 | Mosebrook et al. .......... 307/139 |
| 8,274,450 B2 * | 9/2012 | Abdoulin .................. 345/60 |
| 2010/0080025 A1 | 4/2010 | Terlizzi et al. |
| 2010/0259957 A1 * | 10/2010 | Jin et al. ................. 363/126 |
| 2012/0163050 A1 | 6/2012 | Gonthier et al. |

FOREIGN PATENT DOCUMENTS

| | | |
|---|---|---|
| DE | 19812736 | 9/1999 |
| DE | 19934850 A1 | 1/2001 |
| EP | 1067663 | 1/2001 |
| EP | 1626493 | 2/2006 |
| FR | 2931593 | 11/2009 |
| WO | 2010103458 | 9/2010 |
| WO | WO 2010/10345 A2 | 9/2010 |

OTHER PUBLICATIONS

French Search Report and Written Opinion dated Oct. 5, 2011 from corresponding French Application No. 10/61118.

* cited by examiner

CIRCUIT FOR CONTROLLING A SWITCH IN SERIES WITH A CAPACITIVE ELEMENT

CROSS REFERENCE TO RELATED APPLICATIONS

This application claims the priority benefit of French patent application Ser. No. 11/57231, filed on Aug. 8, 2011, and the priority benefit of French patent application Ser. No. 10/61118, filed on Dec. 23, 2010, which applications are hereby incorporated by reference to the maximum extent allowable by law.

BACKGROUND

1. Technical Field

Embodiments relate to the forming of control circuits for capacitive elements powered with an A.C. power supply voltage. Embodiments more specifically relate to a capacitive power supply voltage for an electronic device having at least two operating modes requiring different supply powers.

2. Discussion of the Related Art

Capacitive elements, which are generally controlled from an A.C. power supply source, are used in electronic motors, electronic lamps, or mere capacitors. For the two first mentioned load types, the capacitive element is generally placed at the secondary of a diode bridge. As to A.C. capacitors, they are series-connected with the A.C. voltage source, often including a series resistor. Such capacitors are often used for capacitive power supply circuits, which are one of the different solutions for supplying power to a load from an A.C. power supply voltage originating, for example, from the mains (220 volts or 110 volts). The power is generally provided across a low-voltage capacitor (for example, from a few volts to a few tens of volts).

Many electronic devices require at least two operating modes requiring different supply powers. For example, many electronic devices have a stand-by mode, with a decreased power consumption with respect to an active mode. It is then desired to avoid useless power consumption by the power supply circuit during periods when the supplied device is not active.

It would be desirable to have a capacitive power supply circuit of simple design, with at least two operating modes capable of providing different supply powers.

More generally, it would be desirable to improve the control of a switch in series with an A.C. powered capacitive element.

SUMMARY

Thus, an embodiment forms an A.C. switch enabling to control an element of capacitive nature, requiring a single control, that is, a switch which is only controlled one half-wave out of two.

Another embodiment provides a capacitive power supply circuit of simple design, having at least two operating modes capable of providing different supply powers.

Thus, an embodiment provides a circuit comprising:
a switch for controlling a capacitive element adapted to be coupled to an A.C. voltage; and
a diode in parallel with the switch.

According to an embodiment, a transistor is provided between a control terminal of the first switch and a first terminal of application of the A.C. voltage.

According to an embodiment, said capacitive element is intended to supply power to a capacitive load.

According to an embodiment, the switch comprises at least one thyristor.

According to an embodiment, the switch comprises two thyristors in antiparallel forming a triac.

According to an embodiment, the circuit further comprises an element for controlling the switch.

According to an embodiment, the capacitive element is arranged between a second terminal of application of the A.C. voltage and the switch.

According to an embodiment, the switch is arranged between a second terminal of application of the A.C. voltage and said capacitive element.

The present invention also provides a capacitive power supply circuit comprising:
a first branch capable of providing a first power level;
a second branch parallel to the first branch, capable of providing a second power level; and
a control circuit such as hereabove, the capacitive element and the switch being comprised in the second branch.

According to an embodiment, the first and second branches connect a second terminal of application of the A.C. voltage to a first terminal of provision of a D.C. voltage, and the first terminal of application of the A.C. voltage is connected to a second terminal of provision of the D.C. voltage.

According to an embodiment, said control element connects the base of the transistor to one of the first and second terminals of provision of the D.C. voltage.

The foregoing and other objects, features, and advantages will be discussed in detail in the following non-limiting description of specific embodiments in connection with the accompanying drawings.

DETAILED DESCRIPTION

Figure 1:
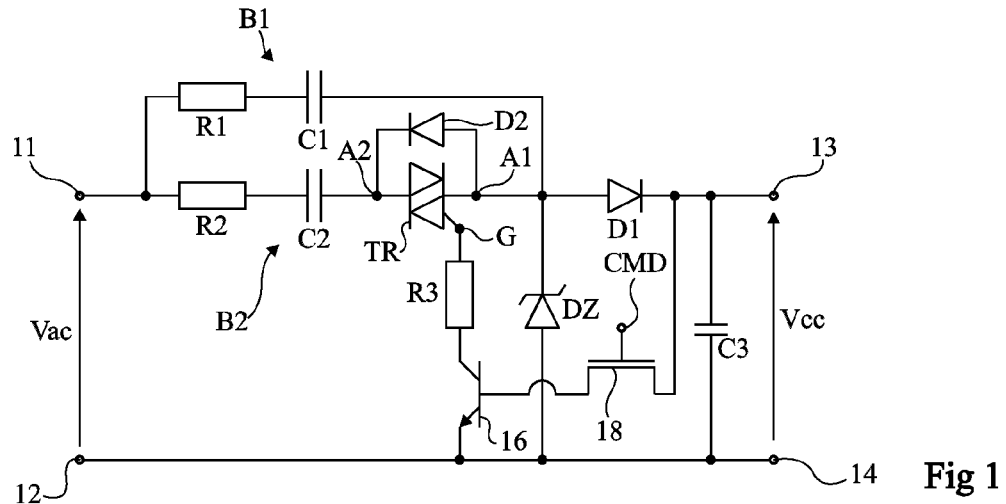
FIG. 1 is an electric diagram of an embodiment of a positive capacitive power supply circuit with two power modes.

For clarity, the same elements have been designated with the same reference numerals in the different drawings. Further, only those elements which are useful to the understanding of the present description have been shown and will be described. In particular, the destination of the power supply voltages generated by the described circuits has not been detailed, the described embodiments being compatible with usual applications of such power supply voltages.

The embodiments will be described in relation with an example of capacitive power supply. They more specifically apply to any control of a switch in series with a capacitive element powered by an A.C. voltage source.

FIG. 1 is an electric diagram of an embodiment of a positive capacitive power supply circuit with two power modes.

The circuit comprises two input terminals 11 and 12 intended to receive an A.C. power supply voltage Vac, for example, the mains voltage, and two output terminals 13 and 14 intended to provide a D.C. power supply voltage Vcc. Output terminal 14 forms the ground and is one with input terminal 12. In this example, terminal 13 corresponds to a terminal for providing the positive power supply voltage.

A resistor R1, in series with a capacitor C1 and a diode D1 having its anode on the side of capacitor C1, connect terminal 11 to terminal 13. Terminals 13 and 14 are connected by a capacitor C3 across which D.C. voltage Vcc is provided.

Diode D1 forms an element of halfwave rectification of voltage Vac to charge capacitor C3. Capacitor C1 has the function of setting the current in the capacitive power supply (in stand-by mode) and capacitor C3 has the function of storing and smoothing power supply voltage Vcc. The value of output voltage Vcc is set by a zener diode DZ grounding the anode of diode D1, the anode of diode DZ being on the ground side. The function of resistor R1 is to limit the current surge, to protect diode DZ and output capacitor C3 against a possible abrupt current peak on powering-on of the circuit.

The operation of a capacitive power supply is known per se. During growth phases of voltage Vac, a current flows through resistor R1, capacitor C1, and diode D1 to load capacitor C3. As long as voltage Vcc has not reached the threshold voltage of diode DZ (to within the voltage drop in diode D1), diode DZ is non-conductive, thus enabling capacitor C3 to charge. As soon as voltage Vcc reaches the threshold voltage of diode DZ (for example, from a few volts to a few tens of volts), the zener diode starts an avalanche, thus limiting the charge voltage of capacitor C3. During negative halfwaves of voltage Vac, the current flows through diode DZ, capacitor C1, and resistor R1, and diode D1 prevents the discharge of capacitor C3 into the A.C. power supply.

Resistor R1 and capacitor C1 define a first capacitive power supply branch B1 capable of providing a first power level.

In parallel with the first branch, a second capacitive power supply branch B2 comprising a limiting resistor R2 in series with a capacitor C2 and a triac TR, connects terminal 11 to the anode of diode D1 (cathode of diode DZ). A first conduction terminal A1 of the triac on the side of gate G of the triac is placed on the anode side of diode D1, and second conduction terminal A2 of the triac is on the side of capacitor C2. Capacitive power supply B2 is capable of providing a second power level. Triac TR forms a switch for activating and deactivating this second branch. Branch B2 further comprises a diode D2 connected parallel to triac TR, the cathode of diode D2 being on the side of terminal A2. This connection of diode D2 with triac TR simplifies the control of the A.C. switch. Indeed, it is then only necessary to control the triac in a single halfwave, the other halfwave being automatically conductive due to diode D2, as soon as capacitor C2 has been charged to a value different from the negative peak of the mains voltage. This simplification enables, for the case of the capacitive power supply application, to form a specific control circuit with elements 16 and 18.

In a first operating mode, triac TR is maintained off.

During positive halfwaves of voltage Vac, diode D2 being non-conductive, the charge current of capacitor C3 only runs through first capacitive power supply branch B1, that is, resistor R1 and capacitor C1. This corresponds to a first power level of the capacitive power supply. On the side of branch B2, capacitor C2 remains at the value reached at the end of the previous halfwave.

During decreasing halfwaves of voltage Vac, the current flows through branch B1. In branch B2, diode D2 remains blocked since capacitor C2 remains charged to the negative peak value of voltage Vac, to within the recharge current, due to the discharge of capacitor C2 into its internal resistor or into a possible external resistor in parallel with capacitor C2.

The A.C. switch, formed of triac TR and of diode D2, is thus effectively off during this first operating mode, both on increasing and decreasing halfwaves of voltage Vac.

In a second operating mode, triac TR is turned on for each increasing halfwave of voltage Vac, by application of an adapted turn-on signal on its gate.

During increasing halfwaves of voltage Vac, the charge current of capacitor C3 flows through both branches B1 and B2. This corresponds to a second power level of the capacitive power supply, greater than the first level. On the side of branch B2, capacitor C2 charges to the positive peak value of voltage Vac.

During decreasing halfwaves of voltage Vac, triac TR is off, but the voltage across diode D2 becomes positive (since voltage Vac becomes smaller than the voltage across capacitor C2), diode D2 becomes conductive, and the current flows through both branches B1 and B2. Capacitor C2 then charges to the negative peak value of voltage Vac. Without diode D2, the triac being off, capacitor C2 would not discharge and would remain at the positive peak value of voltage Vac. At the next positive halfwave, it would then no longer be possible to have a positive current flow through branch B2, and thus to turn on the triac. This would result in a blocking of branch B2. Diode D2 is then in charge of enabling the discharge of capacitor C2 on each negative halfwave of voltage Vac when triac TR has been previously turned on.

Triac TR forms a switch enabling to switch between two power modes. The respective values of capacitors C1 and C2 are selected according to the powers required for the device to be powered. The value of capacitor C2 will generally be selected to be greater than that of capacitor C1 since the power required in active mode (high power) is generally greater than twice the power required in stand-by mode.

In the embodiment of FIG. 1, the switch, although formed by a triac which is a bidirectional component, is made functionally unidirectional, that is, it is only turned on when a positive current flows from capacitor C2 to diode DZ (diode D2 being reverse biased). The flowing of a positive current from diode DZ to capacitor C2 (negative halfwaves) is ensured by diode D2, which enables to simplify the triac control circuit. Indeed, in the absence of diode D2, triac TR would have to be turned on for each decreasing halfwave of voltage Vac. This would require a complex circuit for controlling the triac since, during negative halfwaves of voltage Vac, the potential difference between terminal A1 and terminal 12 is equal to the forward voltage drop of diode DZ (on the order of 0.6 V), which does not enable to draw a gate current. In particular, it would then be necessary to sample power from capacitor C3 to be able to turn on the triac. In an alternative embodiment, triac TR may be replaced with any other one-way switch capable of being turned on in quadrant Q2, that is, by drawing a positive current from terminal A1 to gate G while a positive voltage is applied between terminal A2 and terminal A1.

In the example of FIG. 1, the triac control circuit comprises, between gate G and the ground, a resistor R3 in series with an NPN-type bipolar transistor 16 having its emitter on the ground side. The base of bipolar transistor 16 is connected to terminal 13 by a MOS transistor 18, possibly associated with a resistor in series with transistor 18 and the base of transistor 16. The gate of transistor 18 receives a control signal CMD originating from any circuit capable of indicating a need for a switching from the first operating mode to the second operating mode and conversely.

In the example of FIG. 1, signal CMD is referenced to terminal 14. It for example is a signal originating from the electronic device powered with voltage Vcc, or a circuit capable of automatically detecting load variations across capacitor C3.

Transistor 16 may be replaced with any switch having a control reference on the side of terminal 14, for example, a MOS transistor.

To turn on the triac during a positive halfwave of voltage Vac, MOS transistor 18 is made conductive. Terminal 13 being at a voltage greater than the ground (and in practice greater than one volt, and thus greater than the base-emitter voltage drop of transistor 16 plus the on-state voltage drop of transistor 18), this causes the turning-on of transistor 16, and the flowing of a positive current between terminal A1 and the ground, through gate G, resistor R3, and transistor 16. This gate current triggers the turning-on of the triac, which then remains on until the current that it conducts disappears. This corresponds to the high-power operating mode. On the contrary, if, during an increasing halfwave of voltage Vac, MOS transistor 18 is maintained on, bipolar transistor 16 and triac TR remain off. This corresponds to the low-power operation.

Figure 2:
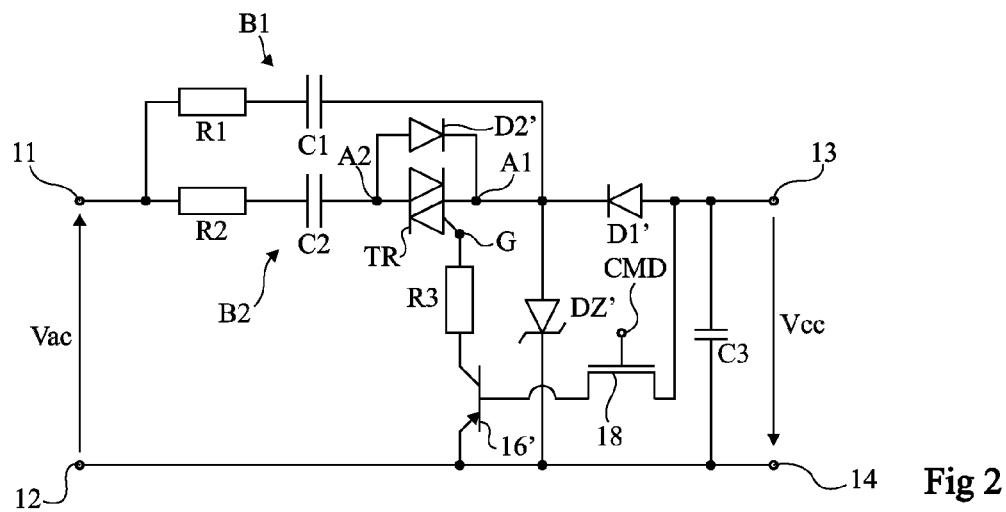
FIG. 2 is an electric diagram of an embodiment of a negative capacitive power supply circuit with two power modes.

FIG. 2 is an electric diagram of an embodiment of a negative capacitive power supply circuit with two power modes. The circuit of FIG. 2 operates similarly to the circuit of FIG. 1, with the difference that terminal 13 this time corresponds to a terminal of provision of a negative power supply voltage (with respect to ground 14).

As compared with the circuit of FIG. 1, a diode D1' replaces diode D1, the anode of diode D1' being on the side of terminal 13 and the cathode of diode D1' being on the side of conduction terminal A1 of triac TR. Capacitor C3 is then only charged during negative halfwaves of input voltage Vac. Zener diode DZ is replaced with a zener diode DZ' having its anode on the cathode side of diode D1'. Diode DZ' sets output voltage Vcc. Diode D2 is replaced with a diode D2' connected parallel to triac TR, the cathode of diode D2 being on the side of terminal A1.

In the first operating mode, triac TR is maintained off.

During negative halfwaves of voltage Vac, diode D2' is non-conducting and the (negative) charge current of capacitor C3 only runs through first capacitive power supply branch B1, that is, resistor R1 and capacitor C1. On the side of branch B2, capacitor C2 remains at its initial value. This corresponds to a first power level of the capacitive power supply.

During increasing halfwaves of voltage Vac, the current flows through branch B1. In branch B2, diode D2 remains blocked since capacitor C2 remains charged to the positive peak value of voltage Vac, to within the recharge current, due to the discharge of capacitor C2 into its internal resistor or into a possible external resistor in parallel with capacitor C2.

The A.C. switch, formed of triac TR and of diode D2, is thus effectively off during this first operating mode, both on increasing and decreasing halfwaves of voltage Vac.

In a second operating mode, triac TR is turned on for each negative halfwave of voltage Vac, by application of an adapted signal on its gate G.

During decreasing halfwaves of voltage Vac, the charge current of capacitor C3 flows through capacitive power supply branches B1 and B2. This corresponds to a second power level of the capacitive power supply, greater than the first level. On the side of branch B2, capacitor C2 charges to the negative peak value of voltage Vac.

During increasing halfwaves of voltage Vac, triac TR is off but, diode D2' being conductive, the current flows through both branches B1 and B2 of the capacitive power supply. Capacitor C2 then charges to the positive peak value of voltage Vac. Without diode D2', the triac being off, capacitor C2 would remain at the negative peak value of voltage Vac. At the next negative halfwave, it would then no longer be possible to have a current flow through branch B2, and thus to turn on the triac. This would result in branch B2 being non-conductive.

Diode D2' is thus in charge of enabling the discharge of capacitor C2 on each increasing halfwave of voltage Vac when the triac has been previously turned on.

As in the embodiment of FIG. 1, the switch formed by triac TR is made functionally unidirectional, that is, it is only turned on when a negative current flows from capacitor C2 to diode DZ' (diode D2' being reverse biased). The flowing of a positive current from capacitor C2 to diode DZ' (positive halfwaves) is ensured by diode D2', as soon as the voltage of capacitor C2 has been reversed by the previous conduction of triac TR, which enables simplifying the triac control circuit. In an alternative embodiment, triac TR may be replaced with any other one-way switch capable of being turned on in quadrant Q4, that is, by injecting a positive current from gate G to terminal A1 while a negative voltage is applied between terminal A2 and terminal A1.

In the example of FIG. 2, the triac control circuit comprises, between gate G of the triac and the ground, a resistor R3 in series with a PNP-type bipolar transistor 16' having its emitter on the ground side. The base of bipolar transistor 16' is connected to terminal 13 by a MOS transistor 18, possibly connected with a resistor in series with transistor 18 and the base of transistor 16. The gate of transistor 18 receives a control signal CMD originating from any circuit capable of indicating a need for switching from the first operating mode to the second operating mode and conversely. In the example of FIG. 2, signal CMD is referenced to terminal 13. Transistor 16' may be replaced with any switch having a control reference on the side of terminal 14, for example, a MOS transistor.

To turn on the triac during a negative halfwave of voltage Vac, MOS transistor 18 is made conductive. Terminal 13 being at a smaller voltage than terminal 12 causes the turning-on of bipolar transistor 16', and the flowing of a negative current between terminal A1 and the ground, through gate G, resistor R3, and transistor 16'. This gate current triggers the turning-on of the triac, which then remains on until the current that it conducts disappears. This corresponds to the high-power operating mode. On the contrary, if, during a decreasing halfwave of voltage Vac, MOS transistor 18 is maintained off, bipolar transistor 16' and triac TR remain off. This corresponds to the low-power operation.

Figure 3:
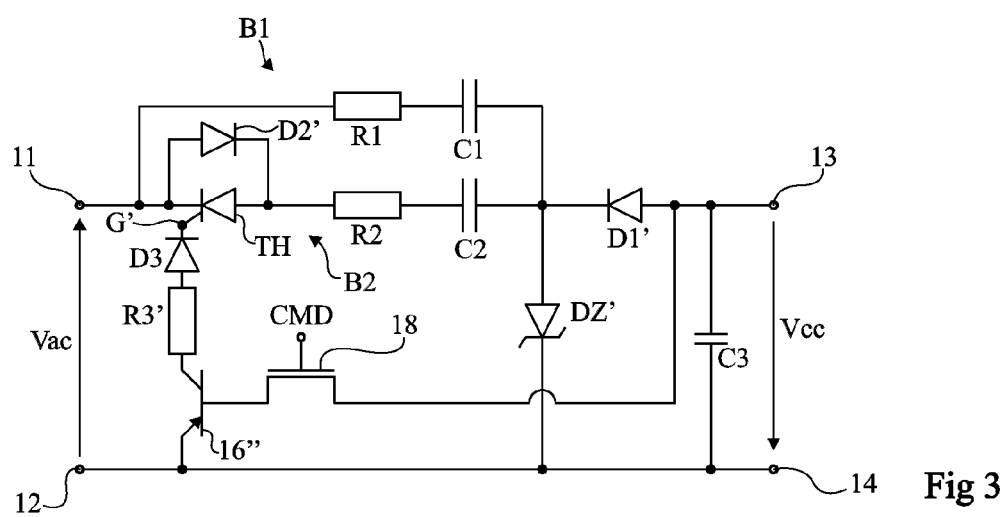
FIG. 3 is an electric diagram of another embodiment of a negative capacitive power supply circuit with two power modes.

FIG. 3 is an electric diagram of another embodiment of a negative capacitive power supply circuit with two power modes. It should be noted that all that will be described in relation with FIG. 3 transposes to a circuit for providing a positive power supply voltage.

In this example, triac TR is replaced with a thyristor TH with a cathode gate G', diode D2' being connected in antiparallel with thyristor TH. Further, thyristor TH and diode D2' are placed upstream of capacitor C2 (that is, between terminal 11 and capacitor C2), rather than downstream of capacitor C2 (that is, between capacitor C2 and diode D1') as in the embodiment of FIG. 2. In the shown example, thyristor TH and diode D2' are connected between terminal 11 and resistor R2, the anode of thyristor TH being on the side of resistor R2.

In the first operating mode, thyristor TH is maintained off.

During decreasing halfwaves of voltage Vac, diode D2' being blocked, the (negative) charge current of capacitor C3 only runs through first capacitive power supply branch B1, that is, resistor R1 and capacitor C1. This corresponds to a first power level of the capacitive power supply.

During increasing halfwaves of voltage Vac, the current flows through branch B1. In branch B2, diode D2' remains non-conducting since capacitor C2 remains charged to the positive peak value of voltage Vac, to within the recharge current, due to the discharge of capacitor C2 into its internal resistor or if an external resistor is placed in parallel across capacitor C2. The A.C. switch, formed of TH and D2', is thus effectively off during this first operating mode, both on increasing and decreasing halfwaves of voltage Vac.

In the second operating mode, thyristor TH is turned on for each negative halfwave of voltage Vac, by application of an adapted signal on its gate G'.

During decreasing halfwaves of voltage Vac, the charge current of capacitor C3 flows through both branches B1 and B2 of the capacitive power supply. This corresponds to a second power level of the capacitive power supply, greater than the first level. On the side of branch B2, capacitor C2 charges to the negative peak value of voltage Vac.

During increasing halfwaves of voltage Vac, diode D2' being conductive, the current flows through both branches B1 and B2 of the capacitive power supply, which enables to discharge capacitor C2.

In the example of FIG. 3, the control circuit of thyristor TH comprises, between gate G' and the ground, a diode D3 in series with a resistor R3' and a PNP-type bipolar transistor 16". The cathode of diode D3 is on the gate side of thyristor TH, and the emitter of transistor 16" is on the ground side. The base of transistor 16" is connected to terminal 13 by a MOS transistor 18, possibly associated with a series resistor. The gate of transistor 18 receives a control signal CMD originating from any circuit capable of indicating a need for a switching from the first operating mode to the second operating mode and conversely. In the example of FIG. 3, signal CMD is referenced to terminal 13. Transistor 16" may be replaced with any switch having a control reference on the side of terminal 14, for example, a MOS transistor.

To turn on the thyristor during a negative halfwave of voltage Vac, MOS transistor 18 is made conductive. Terminal 13 being at a smaller voltage than terminal 12, this causes the turning-on of bipolar transistor 16", and the flowing of a current between the ground and the cathode terminal of thyristor TH, through transistor 16", resistor R3', diode D3 and gate G'. This gate current triggers the turning-on of the thyristor, which then remains on until the end of the negative halfwave of voltage Vac. This corresponds to the high-power operating mode. On the contrary, if, during a negative halfwave of voltage Vac, MOS transistor 18 is maintained off, bipolar transistor 16" and thyristor TH remain off. This corresponds to the low-power operation.

It should be noted that in the embodiment of FIG. 3, diode D3, resistor R3', and transistor 16" are located upstream of resistor R1. They should thus be selected to be capable of withstanding voltage Vac. High-voltage diode D3 is especially used to protect the PN junction between gate G and the cathode of thyristor TH.

It should be noted that in the embodiment described in relation with FIG. 3, thyristor TH may be replaced with a triac.

An advantage of the discussed circuits is that they enable to control an element of capacitive type on an A.C. voltage with a halfwave control.

Another advantage is that the A.C. switch may be controlled while its control reference is different from the reference of the control circuit delivering signal CMD.

In an example of application to a power supply, an advantage of capacitive power supply circuits of the type described in relation with FIGS. 1 to 3 is that they have two operating modes capable of providing different supply powers, while having a simple design.

Another advantage is that the current for starting the thyristors or triacs used as switches for activating or deactivating second branch B2 of the capacitive power supply mainly originates from A.C. power voltage source Vac, and not from output capacitor C3. This enables avoiding unnecessary consumption of the power stored in capacitor C3.

Specific embodiments have been described. Various alterations, modifications and improvements will readily occur to those skilled in the art.

In particular, embodiments in which the switch for activating and deactivating second branch B2 of the capacitive power supply comprises a thyristor, or two thyristors in antiparallel forming a triac, has been described hereabove. It will be within the abilities of those skilled in the art to use any other adapted switch.

Further, it will be within the abilities of those skilled in the art to replace zener diodes DZ and DZ' with any other device capable of limiting the charge voltage of capacitor C3, for example, a properly controlled MOS transistor.

Moreover, MOS transistor 18 may be replaced with any circuit (for example, logic), providing a high level (FIG. 1) or a low level (FIGS. 2 and 3).

Further, capacitive power supply circuits with two power modes have been described as an example. It will be within the abilities of those skilled in the art to adapt the described operation to form capacitive power supply circuits having more than two distinct power modes.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit comprising:
    a first branch configured to provide power at a first power level and comprising a first capacitive element, and a resistive element coupled in series with said first capacitive element;
    a second branch coupled in parallel to the first branch and configured to provide power at a second power level greater than the first power level, the second branch comprising
        a second. capacitive element configured to be coupled to an alternating current (AC) voltage, and
        a bidirectional switch having first and second conduction terminals, and a control terminal, the first and second conduction terminals being configured to conduct a same current when the bidirectional switch is activated;
    a diode coupled in parallel with said bidirectional switch; and
    a transistor coupled between the control terminal and the AC voltage;
    the first and second branches being configured to provide the power at the first power level and the power at the second power level to a capacitive load providing a direct current (DC) voltage.

2. The circuit of claim 1, wherein said second capacitive element is configured to supply power to the capacitive load.

3. The circuit of claim 1, wherein the bidirectional switch comprises two thyristors in antiparallel forming a triac.

4. The circuit of claim 1, wherein said transistor is configured to control the bidirectional switch.

5. The circuit of claim 1, wherein the second capacitive element is coupled between the AC voltage and the bidirectional switch.

6. The circuit of claim 1, wherein the bidirectional switch is coupled between the AC voltage and said second capacitive element.

7. The circuit of claim 1, wherein said first and second branches are coupled between the AC voltage and the DC voltage.

8. The circuit of claim 7, wherein a control terminal of the transistor is coupled to the the DC voltage.

9. The circuit of claim 7, wherein the transistor is configured to control the bidirectional switch based upon a signal from a device powered by the DC voltage.

10. The circuit of claim 1, wherein the transistor is coupled between the control terminal of the bidirectional switch and a conduction terminal of the switch.

11. The circuit of claim 1, wherein the transistor comprises first and second conduction terminals; further comprising an additional transistor having a control terminal; and wherein at least one of said first and second conduction terminals of the transistor is coupled to the control terminal of the additional transistor.

12. The circuit of claim 1, wherein the diode is configured to conduct a positive current away from the AC voltage.

13. The circuit of claim 1, wherein the diode is configured to conduct a positive current toward the AC voltage.

14. The circuit of claim 1, wherein the diode is configured to conduct current during a positive halfwave of the AC voltage.

15. The circuit of claim 1, wherein the diode is configured to conduct current during a negative halfwave of the AC voltage.

16. The circuit of claim 1, further comprising a rectifying element; and wherein the diode is configured to conduct current discharged from the second capacitive element toward said rectifying element.

17. The circuit of claim 1, further comprising a rectifying element; and wherein the diode is configured to enable discharging of the second capacitive element by conducting current from said rectifying element to the capacitive element.

18. A circuit comprising:
a first branch configured to provide power at a first power level and comprising a first capacitive element, and a resistive element coupled in series with said first capacitive element;
a second branch coupled in parallel to said first branch and configured to provide power at a second power level greater than the first power level, the second branch comprising
a second capacitive element configured to be coupled to an alternating current (AC) voltage, and
a switching circuit having first and second conduction terminals configured to conduct a same current when the switching circuit is activated, and a control terminal, said switching circuit configured to control said second capacitive element;
a diode coupled in parallel with said switching circuit; and
a transistor coupled between the control terminal and the AC voltage;
the first and second branches being configured to provide the power at the first power level and the power at the second power level to a capacitive load providing a direct current (DC) voltage.

19. The circuit of claim 18, wherein said switching circuit comprises a triac.

20. The circuit of claim 18, wherein said switching circuit comprises a unidirectional switch.

21. The circuit of claim 18, wherein said transistor is configured to control said switching circuit based on a signal from a device powered by the DC voltage.

22. The circuit of claim 18, wherein the diode is configured to conduct a positive current away from the AC voltage.

23. The circuit of claim 18, wherein the diode is configured to conduct current during a positive halfwave of the AC voltage.

24. The circuit of claim 18, further comprising a rectifying element; and wherein the diode is configured to conduct current discharged from the second capacitive element toward said rectifying element.

25. The circuit of claim 18, wherein said transistor has a control terminal coupled to the DC voltage.

26. The circuit of claim 18, wherein the transistor is coupled between the control terminal of the switching circuit and one of the first and second conduction terminals.

27. A circuit comprising:
a first branch configured to provide power at a first power level and comprising a first capacitive element, and a resistive element coupled in series with said first capacitive element;
a second branch coupled in parallel to the first branch and configured to provide power at a second power level greater than the first power level, the second branch comprising
a second capacitive element configured to be coupled to an alternating current (AC) voltage, and
a thyristor having first and second conduction terminals configured to conduct a same current when said thyristor is activated, and a control terminal, said thyristor configured to control said second capacitive element;
a diode coupled in parallel with said thyristor; and
a transistor coupled between the control terminal and the AC voltage;
the first and second branches being configured to provide the power at the first power level and the power at the second power level to a capacitive load providing a direct current (DC) voltage.

28. The circuit of claim 27, wherein said second capacitive element is configured to supply power to the capacitive load.

29. The circuit of claim 27, wherein said thyristor is coupled between the AC voltage and the second capacitive element.

30. The circuit of claim 27, wherein the transistor is coupled between the control terminal of the thyristor and one of the first and second conduction terminals of said thyristor.

31. The circuit of claim 27, wherein said diode is configured to conduct a positive current away from the AC voltage.

32. The circuit of claim 27, wherein the diode is configured to conduct current during a positive halfwave of the AC voltage.

* * * * *

UNITED STATES PATENT AND TRADEMARK OFFICE
CERTIFICATE OF CORRECTION

| | | |
|---|---|---|
| PATENT NO. | : 8,982,594 B2 | Page 1 of 1 |
| APPLICATION NO. | : 13/332830 | |
| DATED | : March 17, 2015 | |
| INVENTOR(S) | : Passal et al. | |

It is certified that error appears in the above-identified patent and that said Letters Patent is hereby corrected as shown below:

In the Claims

Column 8, Line 44, Claim 1        Delete: "second, capacitive"
                                  Insert: --second capacitive--

Column 9, Line 8, Claim 8         Delete: "to the the"
                                  Insert: --to the--

Signed and Sealed this
Twenty-fifth Day of August, 2015

Michelle K. Lee
*Director of the United States Patent and Trademark Office*